(12) United States Patent
Harding

(10) Patent No.: US 8,136,823 B2
(45) Date of Patent: Mar. 20, 2012

(54) CART FOR TRANSPORTING LAWN CLIPPINGS IN PAPER BAGS

(76) Inventor: Neil Harding, Canton, OH (US)

( * ) Notice: Subject to any disclaimer, the term of this patent is extended or adjusted under 35 U.S.C. 154(b) by 39 days.

(21) Appl. No.: 12/611,382

(22) Filed: Nov. 3, 2009

(65) Prior Publication Data

US 2011/0101649 A1      May 5, 2011

(51) Int. Cl.
*B62B 1/04* (2006.01)
(52) U.S. Cl. ............ 280/47.34; 280/47.35; 280/47.371; 280/651
(58) Field of Classification Search .................. 280/635, 280/638, 639, 643, 651, 656, 43.12, 47.34–35, 280/30, 32.6
See application file for complete search history.

(56) References Cited

U.S. PATENT DOCUMENTS

| | | | |
|---|---|---|---|
| 781,243 A * | 1/1905 | Thompson | 280/651 |
| 2,851,186 A | 9/1958 | Rupe, Jr. | |
| 2,855,210 A | 10/1958 | Joyce | |
| 3,262,713 A | 7/1966 | Crawford, Sr. | |
| 3,292,795 A | 12/1966 | Chappell | |
| 3,341,219 A | 9/1967 | Marini et al. | |
| 3,377,085 A | 4/1968 | Fralick | |
| 3,463,502 A | 8/1969 | Gough | |
| 3,479,047 A | 11/1969 | Bailey | |
| 3,749,414 A | 7/1973 | Lynn | |
| 3,762,738 A | 10/1973 | Christina | |
| 3,907,117 A | 9/1975 | Williams | |
| 3,944,258 A * | 3/1976 | Christensen | 280/408 |
| 4,017,092 A | 4/1977 | Boomer | |
| 4,114,914 A * | 9/1978 | Cohen | 280/30 |
| 4,138,139 A | 2/1979 | Alfonso | |
| 4,769,875 A * | 9/1988 | Hartman | 24/300 |
| D303,443 S | 9/1989 | Shoctor | |
| 5,040,808 A | 8/1991 | McIntyre | |
| 5,070,687 A * | 12/1991 | Schweigert | 56/202 |
| D326,174 S | 5/1992 | McDonald | |
| 5,611,552 A | 3/1997 | Miles et al. | |
| 5,653,458 A * | 8/1997 | Chaparian | 280/30 |
| 5,673,928 A * | 10/1997 | Jury | 280/645 |
| 5,957,482 A * | 9/1999 | Shorter | 280/639 |
| 6,092,817 A * | 7/2000 | Kilmer | 280/47.26 |
| 6,419,433 B1 * | 7/2002 | Chou | 410/97 |
| D477,900 S | 7/2003 | Ditmars, Jr. | |
| 6,676,141 B1 | 1/2004 | Hadley | |
| 6,733,026 B1 * | 5/2004 | Robberson et al. | 280/415.1 |
| 6,746,039 B2 | 6/2004 | Perelli et al. | |
| 6,749,215 B2 | 6/2004 | Perelli et al. | |
| 7,055,847 B2 | 6/2006 | Miller et al. | |
| D532,176 S | 11/2006 | Ditmars, Jr. | |
| 7,222,825 B2 | 5/2007 | Gilbert | |

* cited by examiner

*Primary Examiner* — J. Allen Shriver, II
*Assistant Examiner* — James Triggs
(74) *Attorney, Agent, or Firm* — Emerson Thomson Bennett; Roger D. Emerson; Timothy D. Bennett

(57) ABSTRACT

A cart for transporting associated paper refuse bags may include a first frame foldably attached to a second frame with a hinge for folding the cart between a use condition and a storage condition, a first mesh fixedly attached to the first frame for supporting a first associated paper refuse bag, a second mesh fixedly attached to the second frame for supporting a second associated paper refuse bag, a first plurality of wheels operatively attached to the first frame, a second plurality of wheels operatively attached to the second frame, a handle operatively attached to the first frame for moving the cart, and a plurality of tarp attachment devices for attaching a tarp to cover the associated paper refuse bags.

20 Claims, 8 Drawing Sheets

CART FOR TRANSPORTING LAWN CLIPPINGS IN PAPER BAGS

I. BACKGROUND OF THE INVENTION

A. Field of Invention

This invention pertains generally to carts and more specifically to carts for transporting paper bags filled with lawn clippings and other debris.

B. Description of the Related Art

It is well known to insert garbage, debris, lawn clippings and other refuse into bags (commonly referred to as "garbage bags"). Typically, the bags are then placed on a ground surface at a curb where they are later removed and taken to an appropriate processing center.

It is also known to make such bags out of various materials. Perhaps the two most common materials are plastic and paper. Both plastic bags and paper bags generally work well for their intended purpose. Plastic bags, however, have the disadvantage of being difficult to decompose. Paper bags have the disadvantage of absorbing moisture—from the ground surface they are placed on, from rain, or from other environmental conditions. Such "wet" paper bags are well known to tear apart when they are then lifted from the ground surface. This leads to the spilling of the debris that was in the paper bag onto the ground surface.

Therefore, what is needed is a device and method for using paper bags in a manner that protects the paper bags from environmental conditions.

II. SUMMARY

According to one embodiment of this invention, a cart for transporting associated paper bags includes a first frame foldably attached to a second frame with a hinge for folding the cart between a use condition and a storage condition, wherein a top surface of the first frame and a top surface of the second frame face the same direction when the cart is in the use condition, and wherein the top surface of the first frame and the top surface of the second frame face each other when the cart is in the storage condition; a first mesh fixedly attached to the first frame for supporting a first associated paper refuse bag, the first mesh comprising a first plurality of mesh members and a second plurality of mesh members, and wherein the first plurality of mesh members is offset from the second plurality of mesh members by an angle greater than zero; a second mesh fixedly attached to the second frame for supporting a second associated paper refuse bag, the second mesh comprising a first plurality of mesh members and a second plurality of mesh members, and wherein the first plurality of mesh members is offset from the second plurality of mesh members by an angle greater than zero; a first plurality of wheels operatively attached to the first frame, and a second plurality of wheels operatively attached to the second frame; a handle operatively attached to the first frame for moving the cart; and a plurality of tarp attachment devices for attaching a tarp to cover the associated paper refuse bags.

According to another embodiment of this invention, a cart for transporting associated paper bags includes a first frame having a top surface, wherein the first frame is sideless in which no portion of the first frame extends substantially above the top surface; a first mesh fixedly attached to the first frame for supporting a first associated paper refuse bag, the first mesh comprising a first plurality of mesh members and a second plurality of mesh members, and wherein the first plurality of mesh members is offset from the second plurality of mesh members by an angle greater than zero; a first plurality of wheels operatively attached to the first frame; a handle operatively attached to the first frame for moving the cart; a plurality of tarp attachment devices for attaching a tarp to cover the associated paper refuse bags.

One advantage of this invention is paper refuse bags are easily supported from the ground surface and thus do not absorb moisture from the ground.

Another advantage of this invention is the paper refuse bags remain dry during any precipitation because they are elevated from the ground surface and covered.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
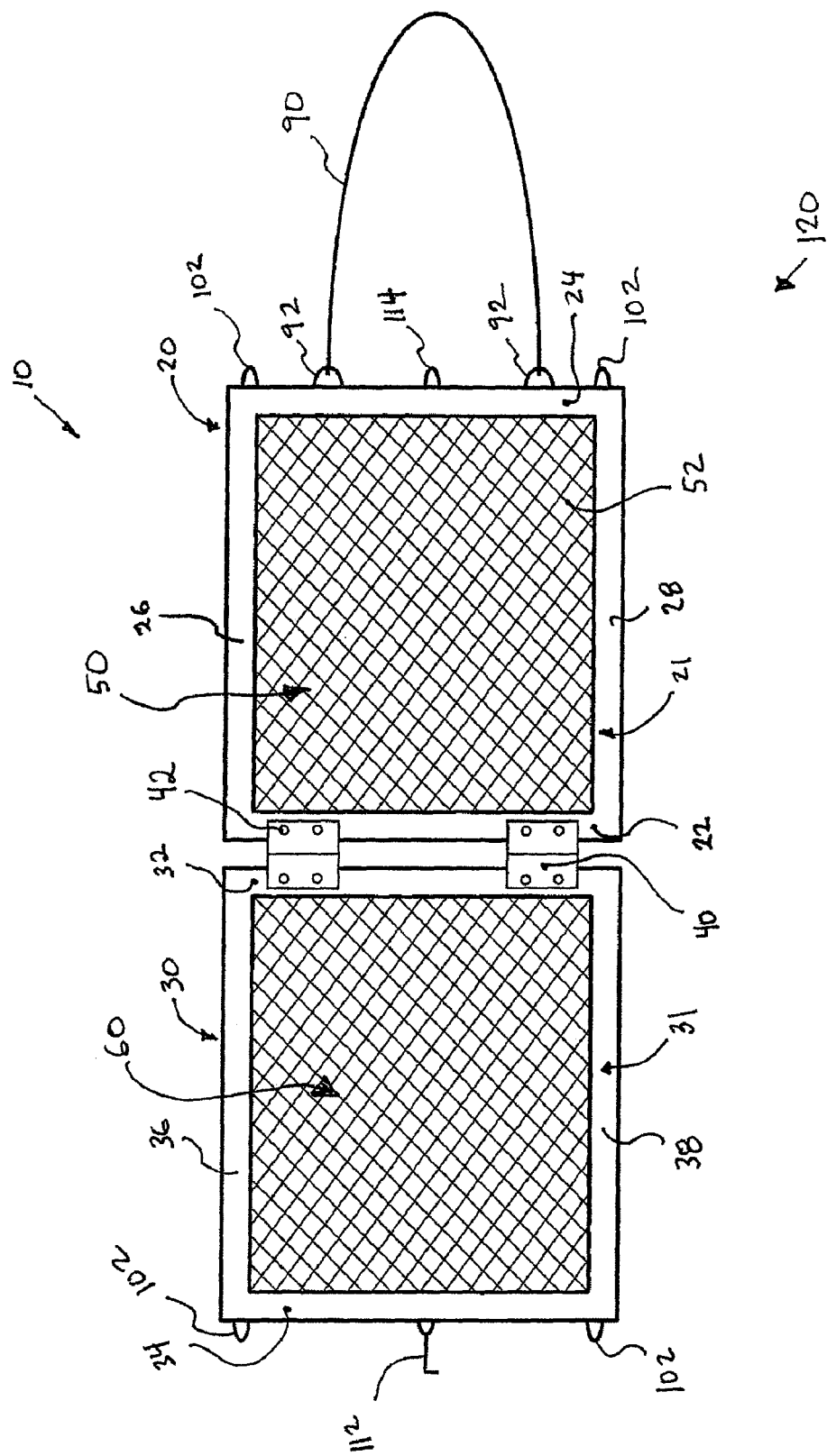
FIG. 1 is a top view of a cart according to one embodiment.
Figure 2:
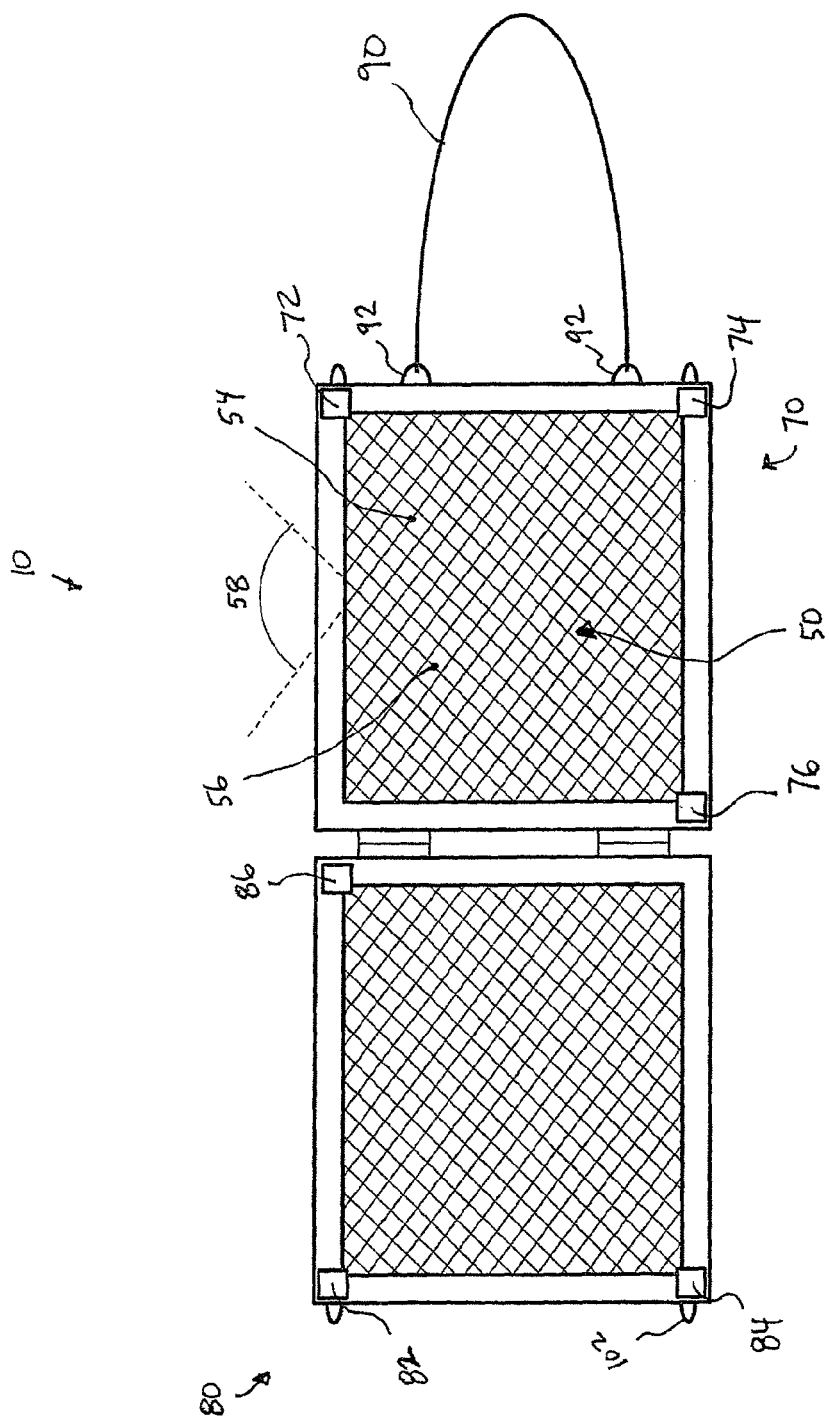
FIG. 2 is a bottom view of the cart shown in FIG. 1.
Figure 3:
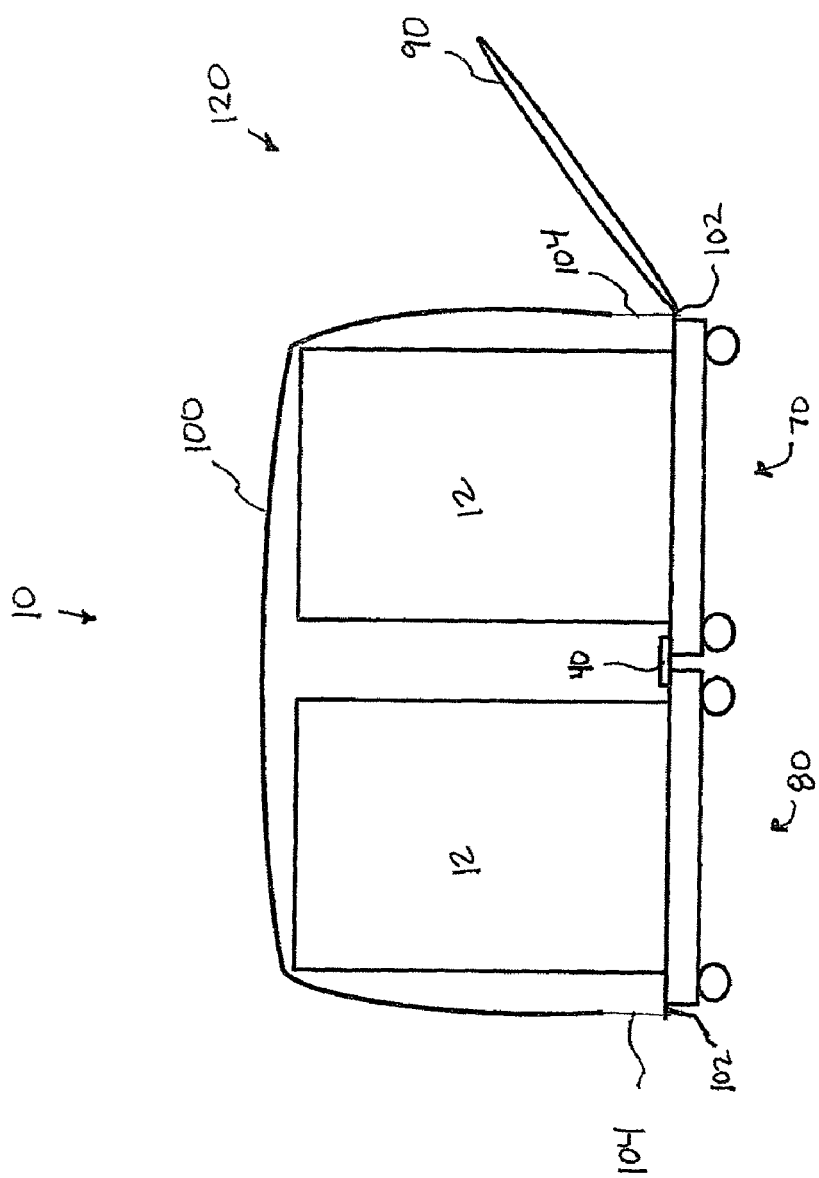
FIG. 3 is a perspective view of a cart in a use condition, according to one embodiment.
Figure 8C:
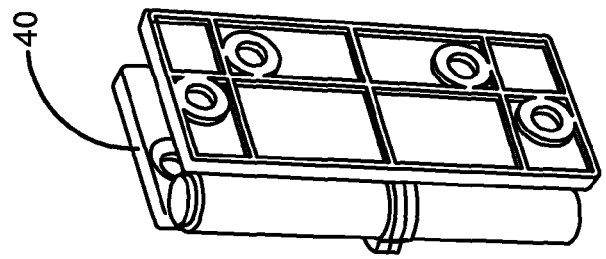
FIG. 8c is perspective view of a double locking bi-fold door hinge shown in a closed position.
Figure 8B:
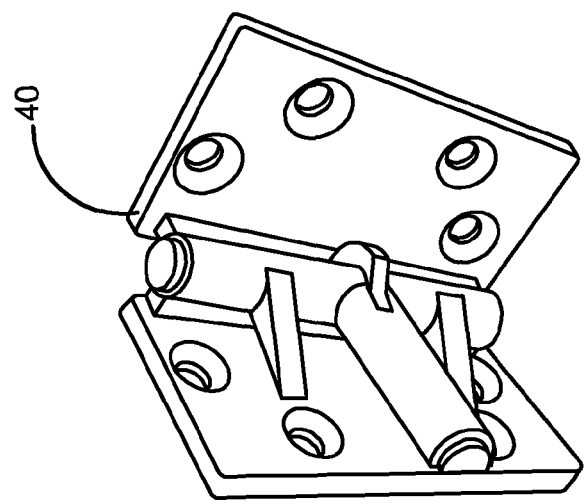
FIG. 8b is perspective view of a double locking bi-fold door hinge shown in an intermediate position.
Figure 8A:
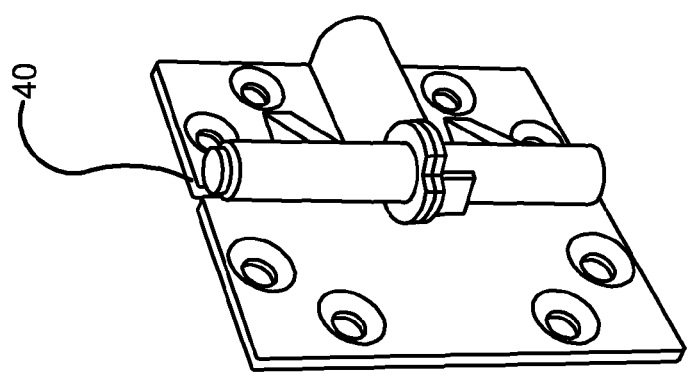
FIG. 8a is perspective view of a double locking bi-fold door hinge shown in an opened position.

Referring to the drawings wherein the showings are for purposes of illustrating embodiments of the invention only and not for purposes of limiting the same, and wherein like reference numerals are understood to refer to like components, FIGS. 1-3 show a cart 10 for transporting paper refuse bags 12 according to an embodiment of this invention. The cart 10 may include two or more frames 20, 30, at least one hinge 40 (two shown), two or more meshes 50, 60, one or more sets wheels 70, 80, a handle 90, at least one tarp attachment device 102, and a cart connector 110. In one embodiment, the cart 10 includes a frame 20, a mesh 50, a set of wheels 70, a handle 90, and at least one tarp attachment device 102. Each frame 20, 30 may be formed of one or more pieces or components, and in one embodiment, frame 20 is formed of four pieces or components 22, 24, 26, 28 and frame 30 is formed of four pieces or components 32, 34, 36, 38. Each frame 20, 30 may be formed of metal, plastic, wood, or any other material chosen with ordinary skill in the art. The frame 20 may have a top surface 21 and the frame 30 may have a top surface 31. Each frame 20, 30 may be sideless. By "sideless" it is meant no portion of any frame extends substantially above the top surface of the frame. The frames 20, 30 may be substantially similar or identical. For the embodiment shown, the longitudinal (the direction that the cart is intended to travel) lengths of the frames 20, 30 are substantially the same. The hinge 40 may be any type hinge chosen with ordinary skill in the art including, but not limited to, a butt hinge, a butterfly hinge, a flush hinge, a barrel hinge, a continuous or piano hinge, or a living hinge. The hinge 40 may also be a locking or double locking bi-fold door hinge, which can lock in the opened and closed positions, and may also lock in one or more intermediate positions, as is well known in the art and shown in FIGS. 8*a*, 8*b*, and 8*c*. The hinge 40 may attach to each frame 20, 30 with any type of fasteners 42 chosen with ordinary skill in the art. In one embodiment. the hinge 40 may attach to the top surface 21 of the frame 20 and the top surface 31 of the frame 30. In another embodiment, the hinge 40 may attach to the portion or member 22 of the frame 20 and the portion or member 32 of the frame 30 with fasteners 42.

With continuing reference to FIGS. 1-3, the handle 90 may be formed of any type of rope, cord, line, string, cable, or twine. The handle 90 may be formed of natural or synthetic fibers or metal wire. As one of ordinary skill in the art would recognize, all these handle embodiments are flexible and thus suitable for use with tensile loads but not compression loads. The handle 90 may attach to the frame 20 with any type of fasteners 92 chosen with ordinary skill in the art including, but not limited to, a u-nail, a u-bolt, a screw, a staple, or a nail. The handle 90 may attach to the portion or member 24 of the frame 20. The mesh 50 supports a paper refuse bag 12, shown in FIG. 3. The mesh 50 may have wires, fibers, filaments, or strands 52, which may be formed of metal, plastic, natural or synthetic fiber, or any combination of these materials. The meshes 50 may have any layout or configuration of wires, fibers, filaments, or strands chosen with ordinary skill in the art. In one embodiment, the mesh 50 has two sets of substantially parallel fibers 54, 56, which are offset from each other by an angle 58 greater than zero degrees. In another embodiment, the mesh 50 has two sets of substantially parallel fibers 54, 56, which are offset from each other by an angle 58 between about 30° and about 120°. The mesh 50 may be attached to the frame 20 with any type of fastener or adhesive chosen with ordinary skill in the art including, but not limited to, staples, nails, screws, glue, or epoxy. The mesh 50 may attach to two or more components of the frame 20. The meshes 50, 60 may be substantially similar or identical. The tarp attachment device 102 may be any type of hook receiving device including, but not limited to, a screw eye, a screw hook, a U-nail, a U-bolt, and a cup hook.

Figure 4:
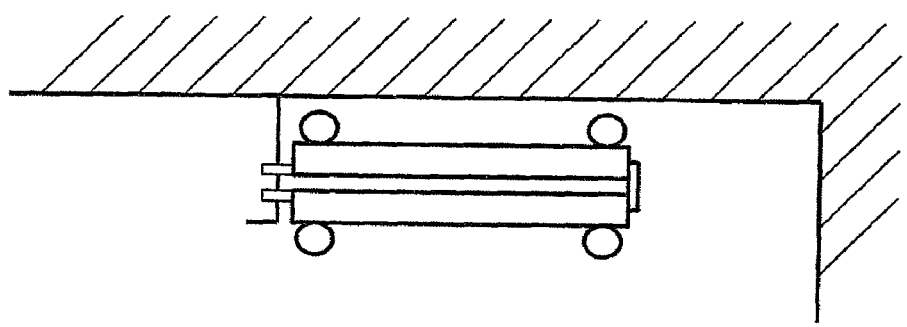
FIG. 4 is a perspective view of a cart in a storage condition, according to one embodiment.

With reference now to FIGS. 2-4, the frame 20 may include a set of wheels 70 and the frame 30 may include a set of wheels 80. Each set of wheels 70, 80 may include one or more wheels. In one embodiment, the frame 20 includes three wheels 72, 74, 76 and frame 30 includes three wheels 82, 84, 86. In another embodiment, the frame 20 includes two wheels 72, 74 and the frame 30 includes two wheels 82, 84. In another embodiment, the frame 20 includes one wheel 72 and the frame 30 includes two wheels 82, 84. The wheels 72, 74, 76, 82, 84, 86 may be any type of wheel chosen with ordinary skill in the art including, but not limited to, any type of caster wheel. The wheels may be attached by any type of fastener chosen with ordinary skill in the art. The wheels may be arranged in any configuration. The wheels may be arranged as shown in FIG. 2, in which the wheel 76 is attached to the portion or member 22 of the frame 20 and the wheel 86 is attached to the portion or member 32 of the frame 30 on the opposite side of the cart 10.

Figure 5:
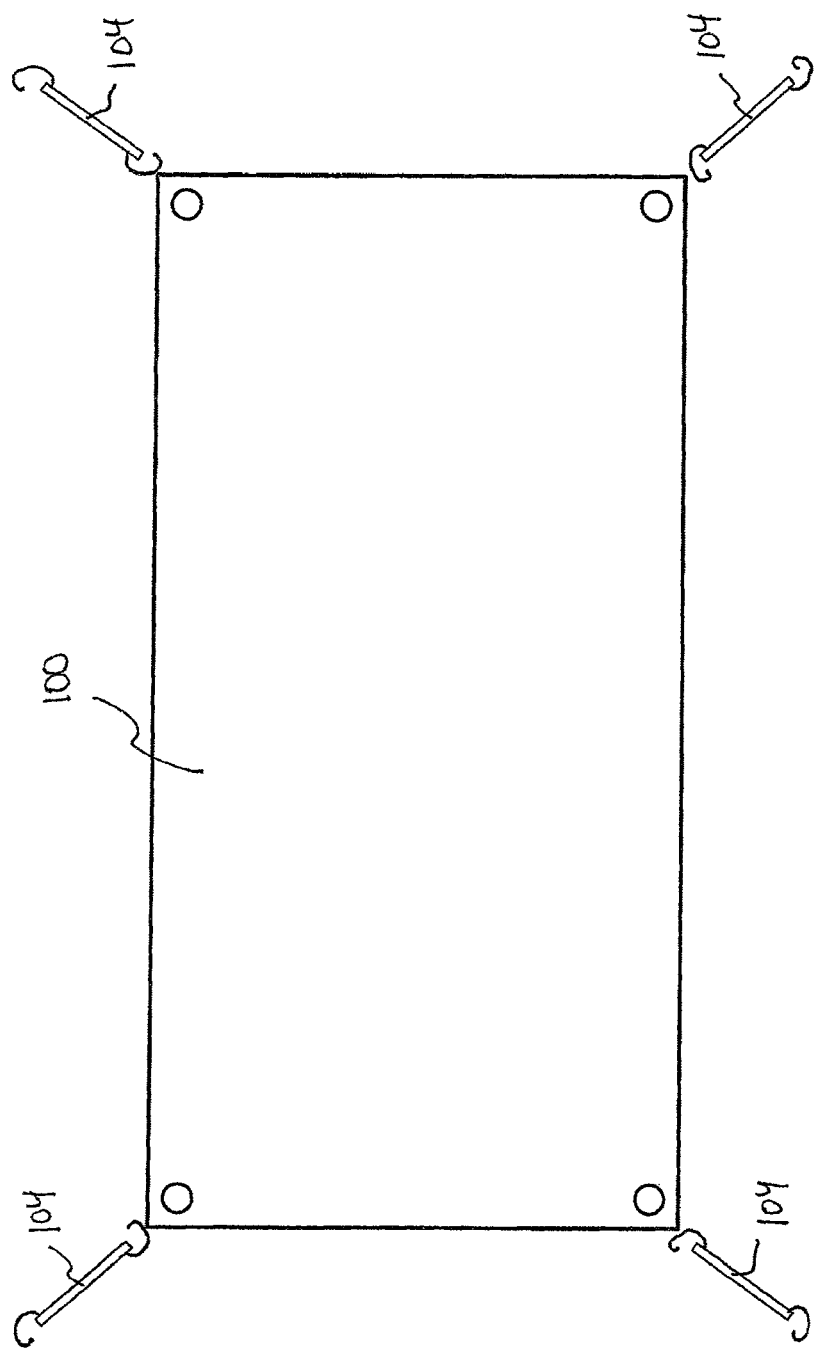
FIG. 5 is a perspective view of tarp including separate attachment means.
Figure 6:
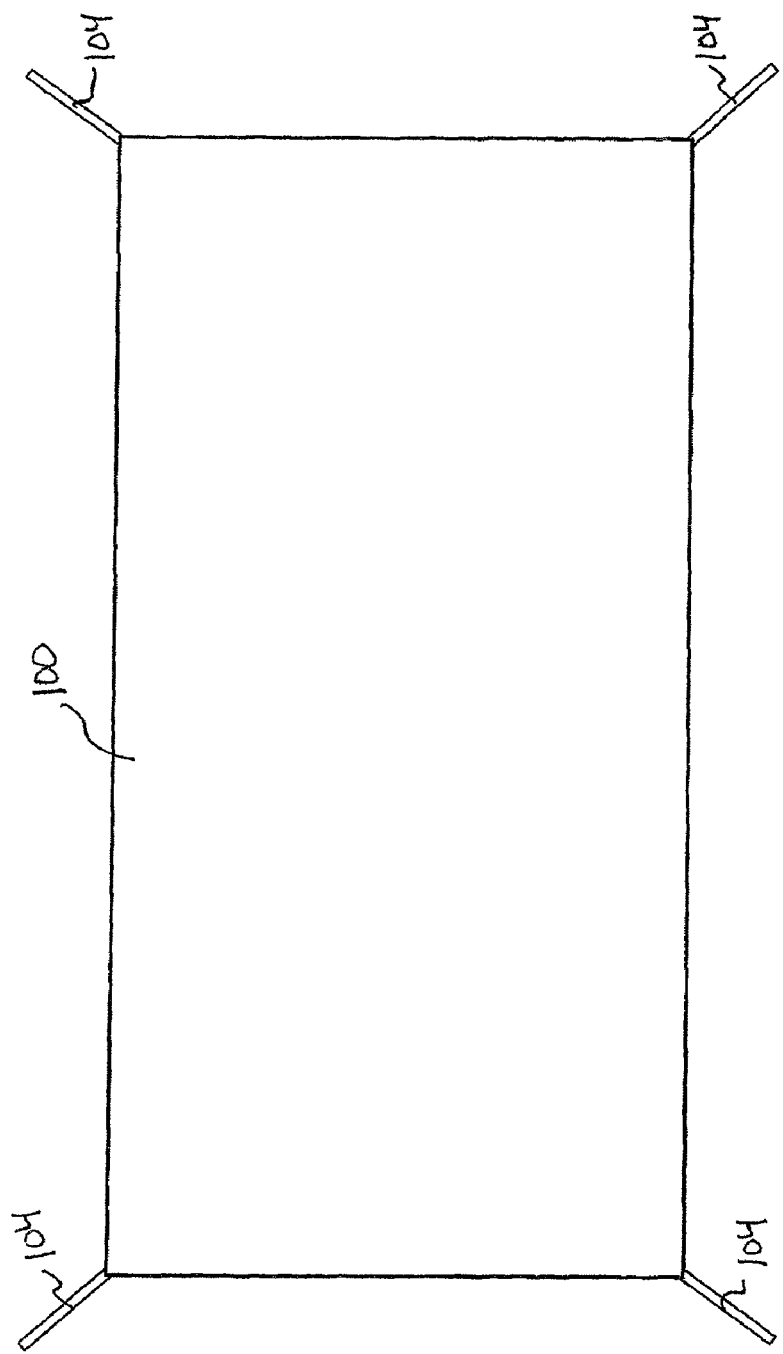
FIG. 6 is a perspective view of a tarp including integrated attachment means.

With reference now to FIGS. 3, 5, and 6, the cart 10 may include a tarp 100 for covering and protecting the paper refuse bags 12 from the elements including precipitation. The tarp 100 may be any type of water resistant tarp or any type of tarp with a water resistant treatment including, but not limited to, a canvas tarp, a polyethylene tarp, a vinyl tarp, a nylon tarp, a polyester tarp, and a neoprene tarp. Separate attachment members 104 may attach the tarp 100 to the tarp attachment devices 102 on the cart 10. In one embodiment, the attachment members 104 may be formed integral with the tarp 100. In another embodiment, the attachment members 104 are fixedly attached to the tarp 100. The attachment members 104 may be elastic, and in some embodiment, are any type of bungee cords, as is well known in the art.

Figure 7:
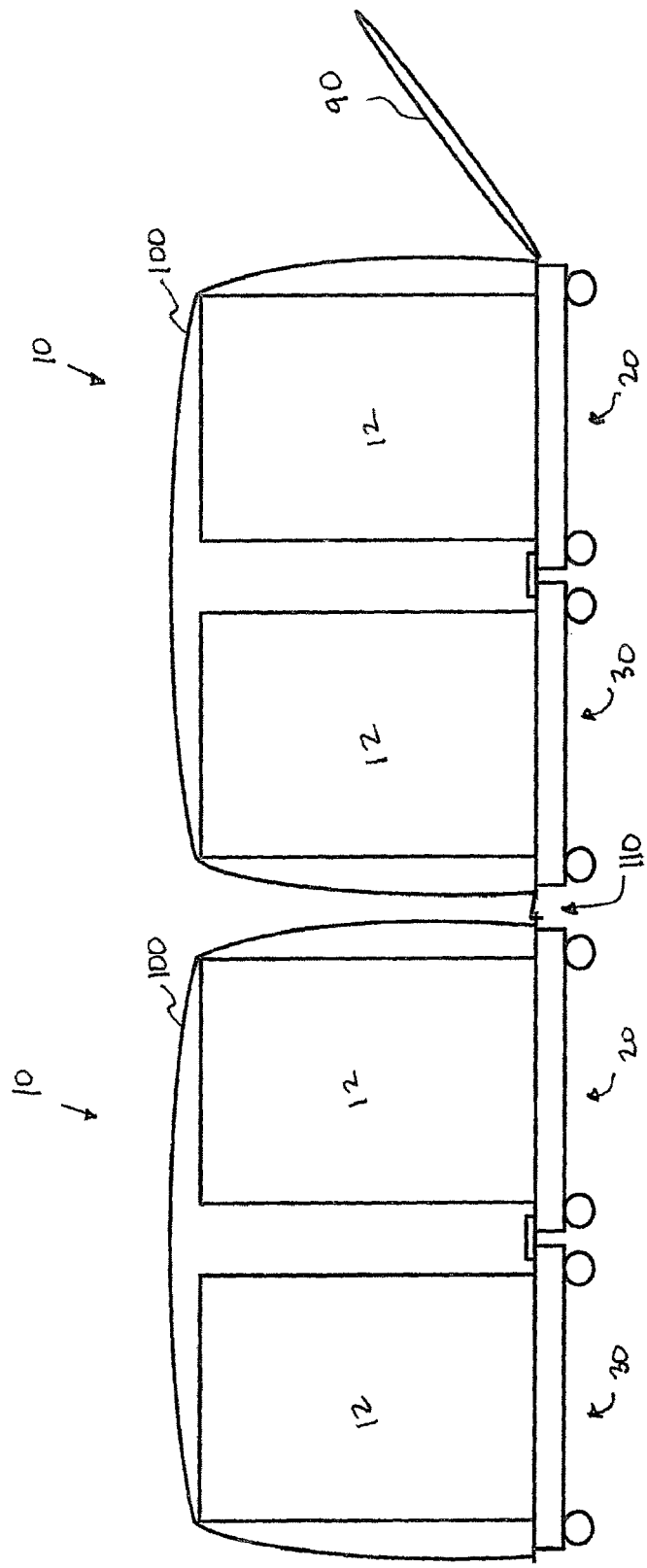
FIG. 7 is a perspective view of two carts connected together, according to one embodiment.

With reference now to FIGS. 1 and 7, the cart connector 110 may be a hinge or any other type of connector chosen with ordinary skill in the art. The cart connector 110 may include a connector member 112 attached to the frame 30 and a connector member 114 attached to the frame 20. In one embodiment, the connector member 112 is a hook and the connector member 114 is a U-shape, C-shape, or oval shape loop for receiving the hook. In another embodiment, the connector member 112 is a screw hook and the connector member 114 is a screw eye for receiving the hook. In another embodiment, the connector member 112 is an L-shaped hitch member and the connector member 114 is a U-shape, C-shape, or oval shape loop hitch member. The connector member 112 may attach to portion or member 34, and connector member 114 may attach to portion or member 24.

With reference now to all the FIGURES, the cart 10 may fold from a use position or condition 120, shown in FIGS. 1-3, to a storage position or condition 130, shown in FIG. 4. In the use condition 120, the top surface 21 of the frame 20 and the top surface 31 of the frame 30 substantially face the same direction. In the storage condition 130, the top surface 21 of the frame 20 and the top surface 31 of the frame 30 substantially face each other. When the cart 10 is in the storage condition 130, the cart may be suspended from a hook, as shown in FIG. 4.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A cart for transporting associated paper refuse bags comprising:

a first frame foldably attached to a second frame with a hinge for folding the cart between a use condition and a storage condition, wherein a top surface of the first frame and a top surface of the second frame face the same direction when the cart is in the use condition wherein the top surface of the first frame and the top surface of the second frame face each other when the cart is in the storage condition, and wherein the first frame and the second frame have substantially the same longitudinal length;

a first mesh fixedly attached to the first frame for supporting a first associated paper refuse bag, the first mesh comprising a first plurality of mesh members and a second plurality of mesh members, and wherein the first plurality of mesh members is offset from the second plurality of mesh members by an angle greater than zero;

a second mesh fixedly attached to the second frame for supporting a second associated paper refuse bag, the second mesh comprising a first plurality of mesh members and a second plurality of mesh members, and wherein the first plurality of mesh members is offset from the second plurality of mesh members by an angle greater than zero;
a first plurality of wheels operatively attached to the first frame, and a second plurality of wheels operatively attached to the second frame;
a flexible handle extending from the first frame for moving the cart;
a plurality of tarp attachment devices for attaching a tarp to cover the associated paper refuse bags.

2. The cart of claim 1, wherein the first frame comprises four frame members arranged in a substantially rectangular shape, wherein the first mesh is fixedly attached to at least two of the frame members, wherein the second frame comprises four frame members arranged in a substantially rectangular shape, wherein the second mesh is fixedly attached to at least two of the frame members, and wherein the hinge is attached to the first frame member of the first frame and the first frame member of the second frame.

3. The cart of claim 2, wherein the first plurality of wheels comprises only three wheels and the second plurality of wheels comprises only three wheels.

4. The cart of claim 1 further comprising a tarp operatively attached to the first tarp attachment device with at least a first elastic attachment member and operatively attached to the second tarp attachment device with at least a second elastic attachment member.

5. The cart of claim 4, wherein the plurality of elastic attachment members are formed integral with the tarp.

6. The cart of claim 1 further comprising a cart connector having a first connector member attached to the first frame and a second connector member attached to the second frame, wherein the first connector member and second connector member operatively connect to each other for connecting two or more carts together.

7. The cart of claim 1, wherein the first plurality of mesh members of the first mesh are arranged substantially parallel to each other and the second plurality of mesh members of the first mesh are arranged substantially parallel to each other, and wherein the first plurality of mesh members of the second mesh are arranged substantially parallel to each other and the second plurality of mesh members of the second mesh are arranged substantially parallel to each other.

8. The cart of claim 1, wherein the plurality of tarp attachment devices includes a first tarp attachment device fixedly attached to the first frame and a second tarp attachment device fixedly attached to the second frame.

9. The cart of claim 1 further comprising a second hinge, wherein the first frame is foldably attached to the second frame with the first hinge and the second hinge.

10. A cart for transporting associated paper refuse bags comprising:
a first frame comprising four frame members arranged in a substantially rectangular shape;
a second frame comprising four frame members arranged in a substantially rectangular shape;
a hinge attached to the first frame member of the first frame and the first frame member of the second frame for folding the cart between a use condition and a storage condition, wherein a top surface of the first frame and a top surface of the second frame face the same direction when the cart is in the use condition, wherein the top surface of the first frame and the top surface of the second frame face each other when the cart is in the storage condition, and wherein first frame and second frame have substantially the same longitudinal length;
a first mesh fixedly attached to at least two of the frame members of the first frame for supporting a first associated paper refuse bag, the first mesh comprising a first plurality of mesh members and a second plurality of mesh members, and wherein the first plurality of mesh members is offset from the second plurality of mesh members by an angle greater than zero;
a second mesh fixedly attached to at least two of the frame members of the second frame for supporting a second associated paper refuse bag, the second mesh comprising a first plurality of mesh members and a second plurality of mesh members, and wherein the first plurality of mesh members is offset from the second plurality of mesh members by an angle greater than zero;
a first plurality of wheels operatively attached to the first frame, wherein the first plurality of wheels comprises only three wheels;
a second plurality of wheels operatively attached to the second frame, wherein the second plurality of wheels comprises only three wheels;
a flexible handle extending from the first frame for moving the cart;
a first tarp attachment device fixedly attached to the first frame and a second tarp attachment device fixedly attached to the second frame for attaching a tarp to cover the associated paper refuse bags;
a tarp operatively attached to the first tarp attachment device with at least a first elastic attachment member and operatively attached to the second tarp attachment device with at least a second elastic attachment member, wherein the plurality of elastic attachment members are formed integral with the tarp; and,
a cart connector having a first connector member attached to the first frame and a second connector member attached to the second frame, wherein the first connector member and second connector member operatively connect to each other for connecting two or more carts together.

11. The cart of claim 10, wherein the hinge is a double locking bi-fold door hinge.

12. The cart of claim 11 further comprising a second hinge attached to the first frame member of the first frame and the first frame member of the second frame for folding the cart between the use condition and the storage condition.

13. The cart of claim 1, wherein each tarp attachment device is one of a screw eye, a screw hook, a U-nail, a U-bolt, and a cup hook.

14. The cart of claim 12, wherein each tarp attachment device is one of a screw eye, a screw hook, a U-nail, a U-bolt, and a cup hook.

15. The cart of claim 6, wherein the first connector member is a hook and the second connector member is one of a U-shaped loop, a C-shaped loop, and an oval shaped loop that receives the hook.

16. The cart of claim 3, wherein:
the first plurality of wheels comprises: a first wheel attached near a first outside edge of the handle end of the first frame; a second wheel attached near a second outside edge of the handle end of the first frame that is opposite the first outside edge; and, a third wheel attached near the first outside edge of the non-handle end of the first frame; and,
the second plurality of wheels comprises: a first wheel attached near the first outside edge of the handle end of the second frame; a second wheel attached near the second outside edge of the handle end of the second frame; and, a third wheel attached near the second outside edge of the non-handle end of the second frame.

17. The cart of claim 6, wherein the first connector member is L-shaped, and the second connector member is one of a U-shaped loop, a C-shaped loop, and an oval shaped loop that receives the L-shaped first connector member.

18. The cart of claim 14, wherein the first connector member is a hook, and the second connector member is one of a U-shaped loop, a C-shaped loop, and an oval shaped loop that receives the hook.

19. The cart of claim 10, wherein:
the first plurality of wheels comprises: a first wheel attached near a first outside edge of the handle end of the first frame; a second wheel attached near a second outside edge of the handle end of the first frame that is opposite the first outside edge; and, a third wheel attached near the first outside edge of the non-handle end of the first frame; and,
the second plurality of wheels comprises: a first wheel attached near the first outside edge of the handle end of the second frame; a second wheel attached near the second outside edge of the handle end of the second frame; and, a third wheel attached near the second outside edge of the non-handle end of the second frame.

20. The cart of claim 19, wherein the first connector member is L-shaped, and the second connector member is one of a U-shaped loop, a C-shaped loop, and an oval shaped loop that receives the L-shaped hitch member.

* * * * *